(12) United States Patent
Kubota (10) Patent No.: US 12,263,856 B2
(45) Date of Patent: Apr. 1, 2025

(54) NOTIFICATION SYSTEM, NOTIFICATION METHOD, AND NON-TRANSITORY STORAGE MEDIUM

(71) Applicant: NEC Corporation, Tokyo (JP)

(72) Inventor: Nanami Kubota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/025,055

(22) PCT Filed: Sep. 18, 2020

(86) PCT No.: PCT/JP2020/035446
§ 371 (c)(1),
(2) Date: Mar. 7, 2023

(87) PCT Pub. No.: WO2022/059164
PCT Pub. Date: Mar. 24, 2022

(65) Prior Publication Data
US 2024/0278796 A1 Aug. 22, 2024

(51) Int. Cl.
*B60W 50/14* (2020.01)
*B60W 40/09* (2012.01)

(52) U.S. Cl.
CPC ........... *B60W 50/14* (2013.01); *B60W 40/09* (2013.01); *B60W 2540/21* (2020.02); *B60W 2540/22* (2013.01)

(58) Field of Classification Search
None
See application file for complete search history.

(56) References Cited

U.S. PATENT DOCUMENTS

| | | | | |
|---|---|---|---|---|
| 178,807 | A | * 6/1876 | Smith | A01G 20/12 172/166 |
| 9,701,307 | B1 | * 7/2017 | Newman | B60W 30/095 |
| 11,975,705 | B1 | * 5/2024 | Chen | B60W 10/20 |

(Continued)

FOREIGN PATENT DOCUMENTS

| | | |
|---|---|---|
| JP | 2007-170232 A | 7/2007 |
| JP | 2007-171154 A | 7/2007 |

(Continued)

OTHER PUBLICATIONS

International Search Report for PCT Application No. PCT/JP2020/035446, mailed on Nov. 17, 2020.

(Continued)

*Primary Examiner* — Fekadeselassie Girma (57) ABSTRACT

The present invention provides a notification system (10) including: a driving feature information acquisition unit (11) that acquires driving feature information that indicates at least one of a driving level and a driving tendency; a state estimation unit (12) that estimates a state of a driver, based on at least one of a piece of vital information, an appearance image, and a piece of speech data of the driver; a detection unit (13) that determines an event to be detected associated with the acquired driving feature information and the estimated state, and executes processing of detecting the determined event; and a notification unit (14) that determines a content to be notified to the driver at a time of detecting the event, based on the notification information, and notifies the determined content.

10 Claims, 7 Drawing Sheets

| DRIVING LEVEL \ STATE | IMPATIENT | IRRITATED | ANXIOUS | DROWSY | DISTRACTED | ... |
|---|---|---|---|---|---|---|
| LEVEL 1 | * * * | * * * | * * * | * * * | * * * | .... |
| LEVEL 2 | * * * | * * * | * * * | * * * | * * * | .... |
| LEVEL 3 | * * * | * * * | * * * | * * * | * * * | .... |
| LEVEL 4 | * * * | * * * | * * * | * * * | * * * | .... |
| LEVEL 5 | * * * | * * * | * * * | * * * | * * * | .... |
| ⋮ | ⋮ | ⋮ | ⋮ | ⋮ | ⋮ | .... |

(56) References Cited

U.S. PATENT DOCUMENTS

| | | | | |
|---|---|---|---|---|
| 2007/0032929 | A1* | 2/2007 | Yoshioka | G08G 1/166 701/1 |
| 2010/0209886 | A1* | 8/2010 | Lin | G09B 19/167 434/66 |
| 2010/0209887 | A1* | 8/2010 | Chin | G09B 19/167 434/66 |
| 2010/0209888 | A1* | 8/2010 | Huang | G09B 19/167 434/66 |
| 2010/0211270 | A1* | 8/2010 | Chin | B62D 6/007 701/44 |
| 2015/0149021 | A1* | 5/2015 | Duncan | B60W 60/0051 701/23 |
| 2015/0258996 | A1* | 9/2015 | Victor | B60W 40/09 340/576 |
| 2015/0298705 | A1* | 10/2015 | Kiyama | G06V 20/597 702/94 |
| 2018/0178807 | A1* | 6/2018 | Murata | G01C 21/34 |
| 2019/0213429 | A1* | 7/2019 | Sicconi | G06F 3/012 |
| 2020/0000392 | A1* | 1/2020 | Nashida | G01C 21/3641 |
| 2021/0232890 | A1* | 7/2021 | Li | G06N 3/063 |
| 2024/0144828 | A1* | 5/2024 | Sato | G08G 1/166 |

FOREIGN PATENT DOCUMENTS

| | | |
|---|---|---|
| JP | 2015-130178 A | 7/2015 |
| JP | 2018-106530 A | 7/2018 |
| JP | 2018-179704 A | 11/2018 |

OTHER PUBLICATIONS

Written opinion for PCT Application No. PCT/JP2020/035446, mailed on Nov. 17, 2020.

* cited by examiner

| STATE / DRIVING LEVEL | IMPATIENT | IRRITATED | ANXIOUS | DROWSY | DISTRACTED | ... |
|---|---|---|---|---|---|---|
| LEVEL 1 | ***** | ***** | ***** | ***** | ***** | ... |
| LEVEL 2 | ***** | ***** | ***** | ***** | ***** | ... |
| LEVEL 3 | ***** | ***** | ***** | ***** | ***** | ... |
| LEVEL 4 | ***** | ***** | ***** | ***** | ***** | ... |
| LEVEL 5 | ***** | ***** | ***** | ***** | ***** | ... |
| ... | ... | ... | ... | ... | ... | ... |

FIG. 5

| STATE / DRIVING TENDENCY | IMPATIENT | IRRITATED | ANXIOUS | DROWSY | DISTRACTED | ... |
|---|---|---|---|---|---|---|
| WEAK POINT AT/ SMOOTH IN LANE CHANGE | PRAISE WHEN SUCCESSFULLY PERFORMED/WHEN VEHICLE FAST APPROACHING FROM BEHIND | | GIVE GUIDANCE WHEN BLINKER IS PUT ON/WHEN VEHICLE FAST APPROACHING FROM BEHIND | | | ... |
| TEND TO EXCEED SPEED/AROUND LEGAL VELOCITY | ALERT IN ADVANCE/PLAY CALMING MUSIC OR EMIT CALMING AROMA IN ANY CASES (OPTIONAL) | ALERT IN ADVANCE/PLAY CALMING MUSIC OR EMIT CALMING AROMA IN ANY CASES (OPTIONAL) | | | AT MOMENT WHEN EXCEEDING FIXED SPEED/WHEN DURATION OF EXCEEDING SPEED EXCEEDS FIXED TIME | ... |
| JUST BEFORE RED LIGHT/STOP WITH ENOUGH TIME | | | | VIBRATE STEERING WHEEL AT POINT IN TIME WHEN YELLOW LIGHT IS DETECTED IN ANY CASES | AT POINT IN TIME WHEN YELLOW LIGHT IS DETECTED/WHEN DECELERATION IS NOT PERFORMED IN FRONT OF YELLOW LIGHT | ... |
| TRAVELING POSITION IS UNSTABLE/ STABLE | INCREASE THRESHOLD VALUE (NOTIFICATION FREQUENCY) THAN USUAL | INCREASE THRESHOLD VALUE (NOTIFICATION FREQUENCY) THAN USUAL | | VIBRATE STEERING WHEEL AT POINT IN TIME WHEN STARTING TO APPROACH WHITE LINE IN ANY CASES | WHEN LIKELY TO CROSS OVER WHITE LINE/WHEN CROSSING OVER WHITE LINE | ... |
| INTER-VEHICLE DISTANCE IS CLOSE/SAFE DISTANCE | | INCREASE THRESHOLD VALUE THAN USUAL/ THRESHOLD VALUE AS USUAL | | AT POINT IN TIME OF DETECTING DROWSINESS/WHEN INTER-VEHICLE DISTANCE IS LESS THAN LEGAL VELOCITY·15 m | | ... |
| .... | .... | .... | .... | .... | .... | ... |

NOTIFICATION SYSTEM, NOTIFICATION METHOD, AND NON-TRANSITORY STORAGE MEDIUM

This application is a National Stage Entry of PCT/JP2020/035446 filed on Sep. 18, 2020, the contents of all of which are incorporated herein by reference, in their entirety.

TECHNICAL FIELD

The present invention relates to a notification system, a notification method, and a program.

BACKGROUND ART

A technique relevant to the present invention is disclosed in Patent Documents 1 and 2. Patent Document 1 discloses a technique for detecting a driver's emotion after notification and changing a notification condition according to a result of detection. Further, Patent Document 1 discloses a technique for determining whether a driver is feeling anxious, and determining to execute notification when the driver is feeling anxious and determining not to execute notification when the driver is not feeling anxious. Furthermore, Patent Document 2 discloses a technique for determining a difficult curve for a driver in advance, and alarming when the driver travels on the difficult curve.

RELATED DOCUMENT

Patent Document

[Patent Document 1] Japanese Patent Application Publication No. 2018-179704
[Patent Document 2] Japanese Patent Application Publication No. 2007-171154

DISCLOSURE OF THE INVENTION

Technical Problem

Performing various pieces of notification to a driver can achieve avoiding an accident or the like. However, unnecessary and excessive notification may lead to an inconvenience such as lowering notification reliability or turning off a notification function by a driver. In view of this, a technique for performing appropriate notification with appropriate frequency is desired.

The technique described in Patent Document 1 considers, in adjusting a way of notification, a driver's emotion that may change on each occasion, whereas does not consider an essential feature such as a driving level or a driving tendency of a driver. On the other hand, Patent Document 2 considers, in adjusting a way of notification, an essential feature of a driver such as strong and weak points, whereas does not consider a driver's state that may change on each occasion. Thus, the technique described in Patent Documents 1 and 2 cannot sufficiently avoid unnecessary and excessive notification in some cases.

A problem of the present invention is to achieve a technique for performing appropriate notification with appropriate frequency to a driver.

Solution to Problem

According to the present invention, provided is a notification system including: a driving feature information acquisition unit that acquires driving feature information that indicates a driving feature including at least one of a driving level and a driving tendency of a driver;
a state estimation unit that estimates a state of the driver, based on at least one of a piece of vital information, an appearance image, and a piece of speech data of the driver;
a detection unit that determines an event to be detected associated with the acquired driving feature information and the estimated state, based on notification information in which the event and a content to be notified to the driver at a time of detecting the event are determined for each the driving feature and for each the state of the driver, and executing processing of detecting the determined event; and
a notification unit that determines a content to be notified to the driver at a time of detecting the event, based on the notification information, and notifying the determined content.

Further, according to the present invention, provided is a notification method including, by a computer:
acquiring driving feature information that indicates a driving feature including at least one of a driving level and a driving tendency of a driver;
estimating a state of the driver, based on at least one of a piece of vital information, an appearance image, and a piece of speech data of the driver;
determining an event to be detected associated with the acquired driving feature information and the estimated state, based on notification information in which the event and a content to be notified to the driver at a time of detecting the event are determined for each the driving feature and for each the state of the driver, and executing processing of detecting the determined event; and
determining a content to be notified to the driver at a time of detecting the event, based on the notification information, and notifying the determined content.

Further, according to the present invention, provided is a program causing a computer to function as:
a driving feature information acquisition unit that acquires driving feature information that indicates a driving feature including at least one of a driving level and a driving tendency of a driver;
a state estimation unit that estimates a state of the driver, based on at least one of a piece of vital information, an appearance image, and a piece of speech data of the driver;
a detection unit that determines an event to be detected associated with the acquired driving feature information and the estimated state, based on notification information in which the event and a content to be notified to the driver at a time of detecting the event are determined for each the driving feature and for each the state of the driver, and executing processing of detecting the determined event; and
a notification unit that determines a content to be notified to the driver at a time of detecting the event, based on the notification information, and notifying the determined content.

Advantageous Effects of Invention

According to the present invention, a technique for performing appropriate notification with appropriate frequency to a driver is achieved.

DESCRIPTION OF EMBODIMENTS

Hereinafter, an example embodiment of the present invention will be described by using the drawings. Note that, a similar component is assigned with a similar reference sign throughout all the drawings, and description therefor will be omitted as appropriate.

"Overview"

A notification system according to a present example embodiment adjusts a way of notification to a driver, based on an essential feature (a driving level, a driving tendency, or the like) of the driver and a state (an emotion, drowsiness, distraction, or the like) of the driver at that time. Specifically, an event to be detected and a content to be notified to a driver at a time of detecting each event are determined in advance for each feature of the driver and for each state of the driver. Then, the notification system determines an event to be detected and a content to be notified to a driver at a time of detecting each event, based on an essential feature of the driver and a state of the driver at that time.

"Configuration"

Next, a configuration of the notification system will be described. First, one example of a hardware configuration of the notification system will be described. Each function unit of the notification system is achieved by any combination of hardware and software, mainly including a central processing unit (CPU) of any computer, a memory, a program to be loaded in a memory, a storage unit (in which a program downloaded from a storage medium such as a compact disc (CD), a server on the Internet, or the like can be stored as well as a program stored in advance in a stage of shipping an apparatus) such as a hard disk for storing the program, and an interface for network connection. In addition, it should be understood by a person skilled in the art that there are a variety of modified examples of a method or an apparatus for achieving the same.

Figure 1:
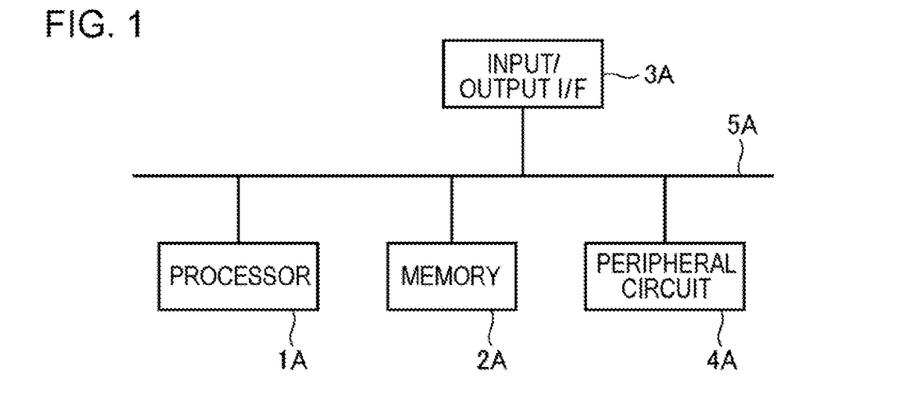
FIG. 1 is one example of a hardware configuration diagram of a notification system according to a present example embodiment.

FIG. 1 is a block diagram illustrating a hardware configuration of the notification system. As illustrated in FIG. 1, the notification system includes a processor 1A, a memory 2A, an input/output interface 3A, a peripheral circuit 4A, and a bus 5A. The peripheral circuit 4A includes various modules. The notification system may not include the peripheral circuit 4A.

The bus 5A is a data transmission path through which the processor 1A, the memory 2A, the peripheral circuit 4A, and the input/output interface 3A transmit and receive data to and from one another. The processor 1A is an arithmetic processing apparatus such as, for example, a CPU or a graphics processing unit (GPU). The memory 2A is a memory such as, for example, a random access memory (RAM) or a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can give an instruction to each module to perform an arithmetic operation, based on an arithmetic operation result thereof.

The notification system may be configured by one physically and/or logically unified apparatus, or may be configured by a plurality of physically and/or logically separated apparatuses. In the latter case, each of the plurality of apparatuses can include the hardware configuration as illustrated in FIG. 1.

Figure 2:
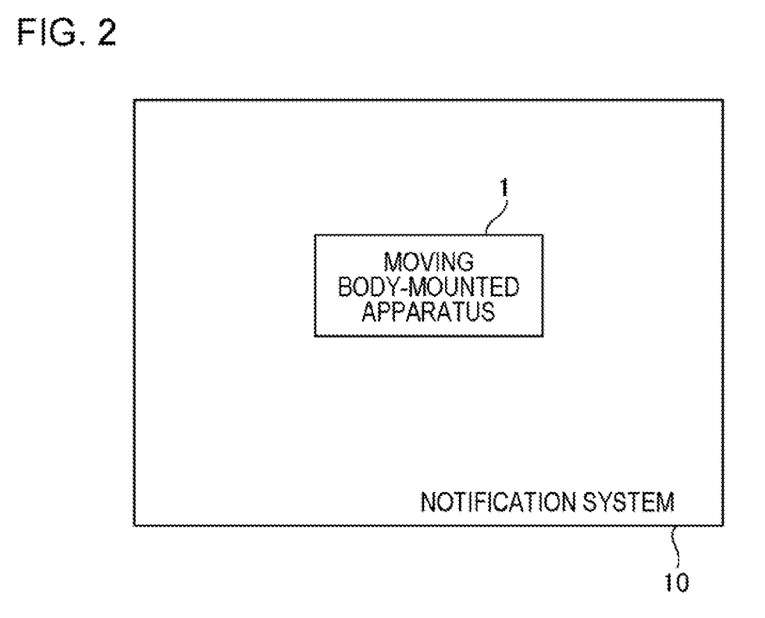
FIG. 2 is a function block diagram illustrating an implementation example of the notification system according to the present example embodiment.

Next, a function configuration of a notification system 10 will be described. As illustrated in FIG. 2, the notification system 10 is configured by a moving body-mounted apparatus 1. The moving body-mounted apparatus 1 is an apparatus being mounted on a moving body. The moving body is an object that moves based on a driver's operation, and examples thereof include a vehicle such as an automobile, a motorcycle, a truck, or a train, an aircraft, a watercraft, and the like.

Figure 3:
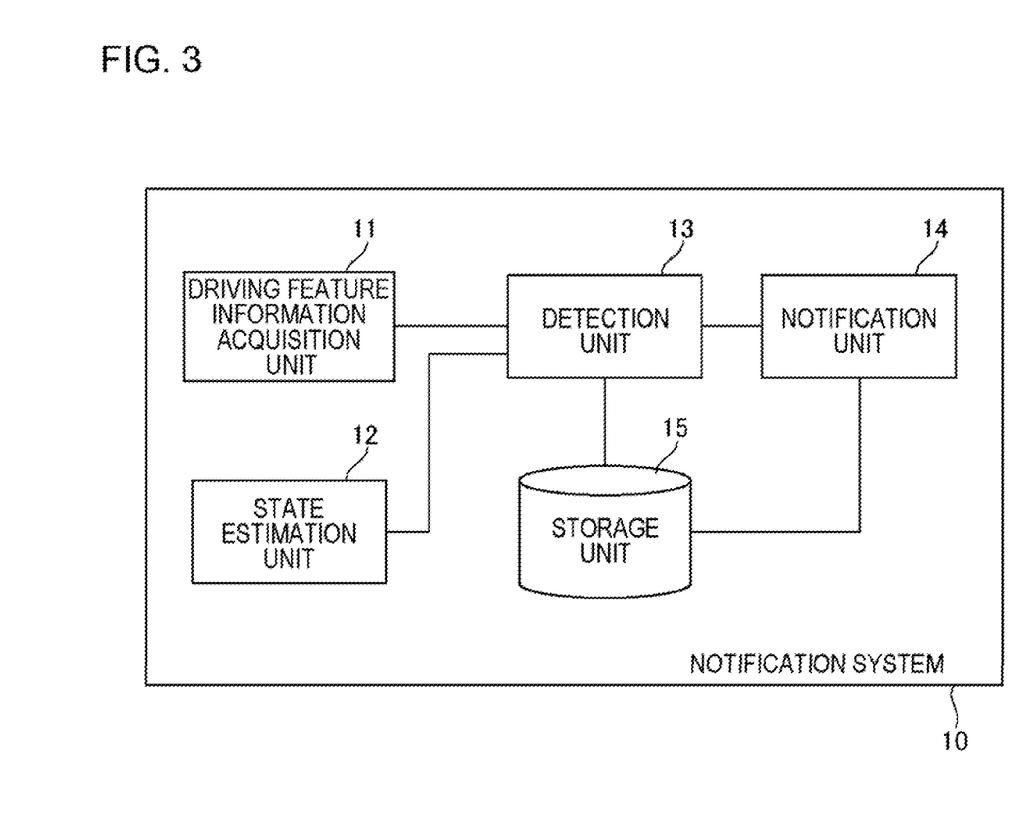
FIG. 3 is a function block diagram illustrating a function configuration of the notification system according to the present example embodiment.

As illustrated in FIG. 3, the notification system 10 includes a driving feature information acquisition unit 11, a state estimation unit 12, a detection unit 13, a notification unit 14, and a storage unit 15.

The driving feature information acquisition unit 11 acquires driving feature information that indicates a driving feature including at least one of a driving level and a driving tendency of a driver. The driving feature information is stored in advance in the storage unit 15. Then, the driving feature information acquisition unit 11 reads out the driving feature information stored in the storage unit 15, and thereby achieves acquisition of the driving feature information.

Note that, configuration may be made in such a way that driving feature information of each of a plurality of drivers (users) can be stored in the storage unit 15 in association with driver identification information. In this case, the driving feature information acquisition unit 11 acquires driver identification information, and reads out driving feature information associated with the acquired driver identification information. The driver identification information may be biological information (fingerprint information, facial information (a feature value of an appearance of a face), voiceprint information, iris information, or the like), may be a name or a nickname, may be a combination of another letter or numeral, or may be others. The notification system 10 includes an input apparatus that accepts input of these pieces of driver identification information, and accepts input of driver identification information via the input apparatus.

Besides the above, driving feature information of each of a plurality of drivers may be stored in a server configured communicably with the notification system 10 in association with driver identification information. In this case, the driving feature information acquisition unit 11 acquires driver identification information in a way similar to the above, then requests the server for driving feature information associated with the acquired driver identification information, and acquires predetermined driving feature information from the server.

A timing at which the driving feature information acquisition unit 11 acquires driving feature information is, but not particularly limited, preferably a timing after a moving body is powered on and before the moving body starts moving.

Next, an example of processing of generating driving feature information stored in the storage unit 15 will be described.

Generation Processing Example 1

The driving feature information may be generated based on data being collected by a sensor mounted on a moving body during past driving of a driver. A type of the sensor mounted on a moving body is not particularly limited, and can include every possible widely-known sensor. For example, the sensor mounted on a moving body may include a sensor, such as a steering wheel, an accelerator, a brake, a blinker, or a light, that detects a content of an operation performed on every possible operation target operated by a driver, a sensor that detects velocity of a moving body, a sensor (a camera, a microphone, a ranging sensor, an object detection sensor, or the like) that detects an external situation of a moving body, a sensor (a camera, a microphone, a sensor that detects vital information (a heart rate, respiration, a blood pressure, a body temperature, or the like) of a driver, or the like) that detects an internal situation of a moving body, a sensor that detects a position of a moving body, and the like. The sensor that acquires vital information may be installed on a steering wheel part of a moving body. For example, data generated by these sensors may be acquired from an electronic control unit (ECU).

An algorithm for computing a driving level and a driving tendency of a driver, based on data generated by these sensors, is a matter of design choice, and every possible well-known technique can be employed. Further, processing of computing a driving level and a driving tendency of a driver, based on data generated by these sensors, may be performed by the notification system 10, may be performed by a server configured communicably with the notification system 10, or may be performed by another apparatus.

Note that, the driving level indicates a degree of proficiency in a driving skill, and may be indicated by an index divided in a plurality of stages such as, for example, levels 1 to 5, may be indicated by a score of 100 points maximum, or may be indicated by another approach.

The driving tendency indicates a tendency of a driver's way of driving in each of a plurality of driving operations defined in advance. Examples of the driving tendency include, for example, a tendency of an inter-vehicular distance from a car ahead (example: a risky distance closer than a reference value, a safe distance farther than a reference value), a tendency of a distance from a peripheral vehicle at a time of lane change or right and left turning (example: a risky distance closer than a reference value, a safe distance farther than a reference value), a tendency of a distance from a pedestrian, a bicycle, a motorcycle, or the like at a time of passing by the same (example: a risky distance closer than a reference value, a safe distance farther than a reference value), a tendency of exceeding legal velocity (example: tend to exceed legal velocity, not tend to exceed legal velocity), a tendency of following a traffic signal (example: safe driving stopping at a red light or a yellow light, risky driving rushing through a red light or a yellow light), a tendency of a braking timing (example: brake after a red light is detected, brake at a yellow light), a tendency of a traveling position within a traveling lane (example: unstable driving not keeping a uniform distance from a right or left line delimiting a traveling lane, stable driving keeping the uniform distance), a tendency of a timing of putting a blinker on (example: put a blinker on immediately before right or left turning, put a blinker on M seconds before right or left turning), strong and weak points at lane change (example: can change a lane without interfering with driving of another vehicle (without need of deceleration, lane change, or the like of another vehicle) (strong point), tend to interfere with driving of another vehicle (weak point)), or the like.

Generation Processing Example 2

The driving feature information may be generated based on a content of declaration from a driver. For example, a questionnaire that includes various types of questions (a driving record, a driving frequency, a driving tendency, and the like) relating to driving may be performed on each driver. Then, a driving level and a driving tendency may be computed from an answer result of the questionnaire by using a predetermined algorithm. Accepting input of answering the questionnaire and processing of computing a driving level and a driving tendency from an answer result of the questionnaire may be performed by the notification system 10, may be performed by a server configured communicably with the notification system 10, or may be performed by another apparatus.

The state estimation unit 12 estimates a state of a driver, based on at least one of a piece of vital information, an appearance image, and a piece of speech data of the driver. The vital information is a heart rate, respiration, a blood pressure, a body temperature, or the like. The appearance image is an image that includes at least a driver's face. The appearance image enables detection of a driver's expression and a driver's eye direction. The speech data are voice data recording a content of driver's speech. The speech data enable detection of a content of driver's speech, a volume of driver's voice, and the like.

The state of a driver to be estimated includes at least one of a driver's emotion, presence/absence of driver's drowsiness, and a state of driver's attention (distracted, concentrating, or the like). The emotion is, but not limited to, calm (a normal state, usual), impatient, irritated, anxious, relieved, angry, nervous, relaxed, and the like. The state estimation unit 12 can estimate a state as described above, based on a temporal change of vital information (a heart rate, respiration, a blood pressure, a body temperature, or the like), a result of comparison with usual vital information registered in advance, a driver's expression, a temporal change of a driver's expression, a result of comparison with a driver's usual expression registered in advance, a driver's eye direction, a temporal change of a driver's eye direction, a content of driver's speech, a volume of driver's voice, a temporal change of a volume of driver's voice, a result of comparison with a usual volume of driver's voice registered in advance, or the like. An algorithm for estimating the above-described state from these pieces of data is a matter of design choice, and every possible technique can be employed.

The state estimation unit 12 repeatedly acquires at least one of a piece of vital information, an appearance image, and a piece of speech data of a driver, and repeatedly estimates a latest state of the driver. For example, the state estimation unit 12 may continue the processing while a moving body is powered on.

The storage unit 15 stores notification information in which an event to be detected and a content to be notified to a driver at a time of detecting the event are determined for each driving feature and for each state of the driver.

Figure 4:
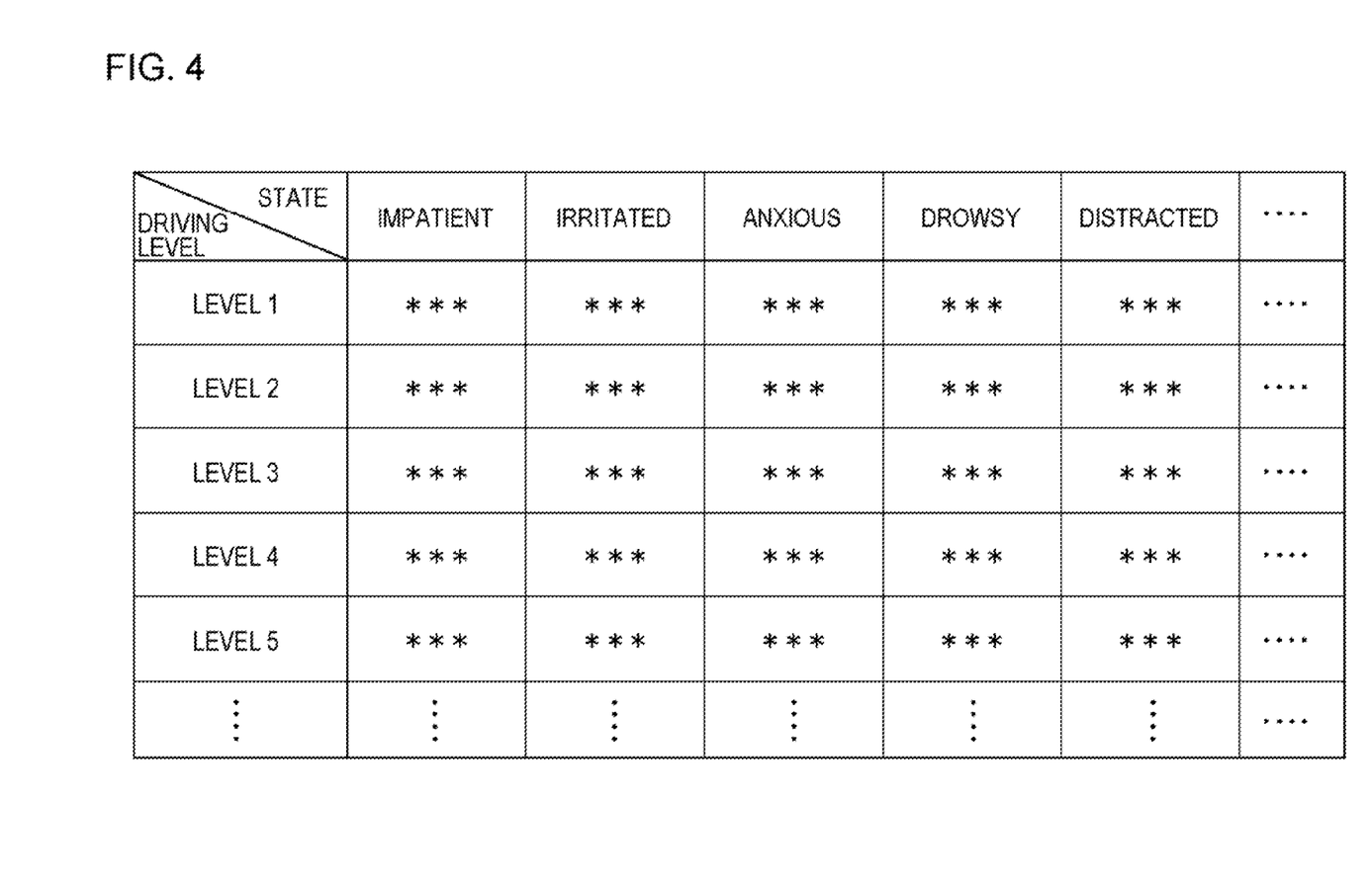
FIG. 4 is a diagram schematically illustrating one example of information processed by the notification system according to the present example embodiment.

FIG. 4 illustrates one example of notification information. In the illustrated example, an event to be detected and a content to be notified to a driver at a time of detecting the event are determined for each driving level and for each state of the driver.

The event to be detected is an event being preferably notified to a driver at each driving level when occurring in each state of the driver, and a content thereof is different depending on a driving level and a state of the driver. The number of events to be detected and notified is larger as lower a driving level is. Further, the number of events to be detected and notified is larger in an unstable (irritated, anxious, impatient, drowsy, distracted, or the like) state than in a stable (calm or the like) state.

Further, as the event to be detected, an event for which a predetermined measured value collected by a sensor mounted on a moving body deviates from a reference range may be defined. The measured value is, but not limited to, a distance from a peripheral object, a distance to a right or left traveling lane, velocity of a moving body, or the like. In addition, an upper limit value or a lower limit value of the reference range may be different for each driving feature (driving level, driving tendency). Further, an upper limit value or a lower limit value of the reference range may be different for each state of a driver.

Further, an amount of information to be notified (a quantity of contents to be notified) may be different depending on a driving level and a state of a driver. The amount of information to be notified is larger as lower a driving level is. Further, the amount of information to be notified is larger in an unstable (irritated, anxious, impatient, drowsy, distracted, or the like) state than in a stable (calm or the like) state.

Figure 5:
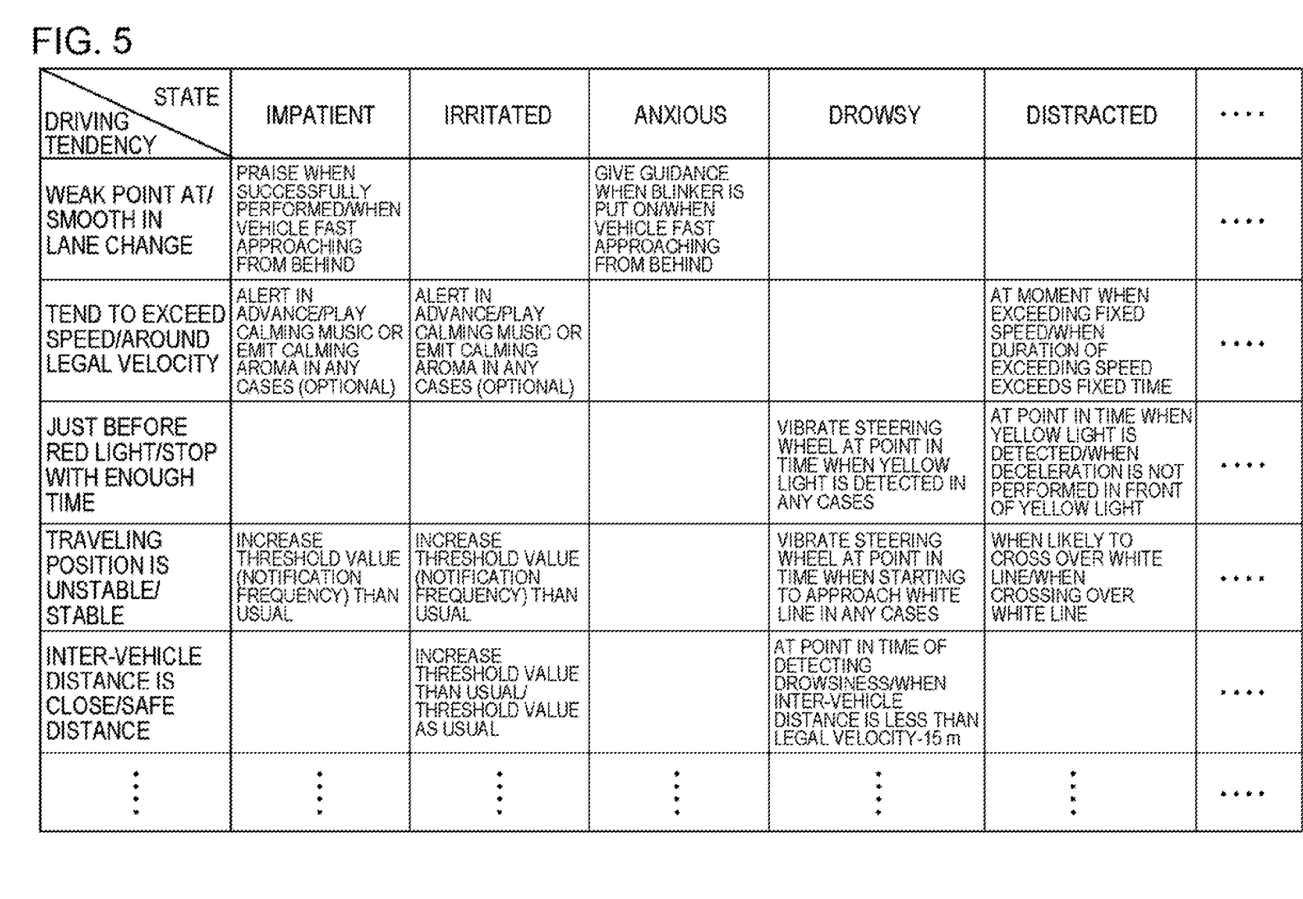
FIG. 5 is a diagram schematically illustrating one example of information processed by the notification system according to the present example embodiment.

FIG. 5 illustrates another example of notification information. In the illustrated example, an event to be detected and a content to be notified to a driver at a time of detecting the event are determined for each driving tendency and for each state of the driver. In the illustrated example, following contents are defined as one example.

A driver having a "driving tendency: weak point at lane change" and in a "state: impatient" is notified, when the driver succeeds in lane change (example: when the driver can change a lane without interfering with driving of another vehicle (without need of deceleration, lane change, or the like of another vehicle)), that the lane change is successfully performed. In this case, an event to be detected is that a driver can change a lane without interfering with driving of another vehicle.

A driver having a "driving tendency: strong point at lane change (smooth)" and in a "state: impatient" is notified, when a vehicle fast approaching from behind on a lane at a lane-change destination (example: a vehicle moving at predetermined velocity or more and a distance therefrom is less than a threshold value) is detected, that the fast approaching vehicle is detected. Note that, the notification may be performed for a driver having a "driving tendency: weak point at lane change" and in a "state: impatient". In this case, an event to be detected is presence of a vehicle fast approaching from behind on a lane at a lane-change destination.

A driver having a "driving tendency: tend to exceed legal velocity" and in a "state: impatient" is alerted relating to velocity in advance (before exceeding legal velocity). Notification is performed at any timing. Alerting relating to velocity may be performed repeatedly at a predetermined time interval. In this case, an event to be detected is arrival of a notification timing determined in advance.

For a driver having a "driving tendency: not tend to exceed legal velocity (around legal velocity)" and in a "state: impatient", calming music determined in advance is played, or a calming aroma determined in advance is emitted in a moving body. Playing music or emitting an aroma is performed at any timing. Note that, the processing may be performed for a driver having a "driving tendency: tend to exceed legal velocity" and in a "state: impatient". In this case, an event to be detected is arrival of a timing of playing music or emitting an aroma determined in advance.

A driver having a "driving tendency: a traveling position is unstable" and in a "state: impatient", and a driver having a "driving tendency: a traveling position is stable" and in a "state: impatient" are notified, at a timing when a distance from a right or left line delimiting a traveling lane becomes equal to or less than a threshold value, that the distance becomes equal to or less than the threshold value. In addition, the threshold value is increased than usual to increase notification frequency. In this case, an event to be detected is that a distance from a right or left line delimiting a traveling lane becomes equal to or less than a threshold value.

A driver having a "driving tendency: tend to exceed legal velocity" and in a "state: irritated" is alerted relating to velocity in advance (before exceeding legal velocity). Notification is performed at any timing. Alerting relating to velocity may be performed repeatedly at a predetermined time interval. In this case, an event to be detected is arrival of a notification timing determined in advance.

For a driver having a "driving tendency: not tend to exceed legal velocity (around legal velocity)" and in a "state: irritated", calming music determined in advance is played, or a calming aroma determined in advance is emitted in a moving body. Playing music or emitting an aroma is performed at any timing. Note that, the processing may be performed for a driver having a "driving tendency: tend to exceed legal velocity" and in a "state: irritated". In this case, an event to be detected is arrival of a timing of playing music or emitting an aroma determined in advance.

A driver having a "driving tendency: a traveling position is unstable" and in a "state: irritated", and a driver having a "driving tendency: a traveling position is stable" and in a "state: irritated" are notified, at a timing when a distance from a right or left line delimiting a traveling lane becomes equal to or less than a threshold value, that the distance becomes equal to or less than the threshold value. In addition, the threshold value is increased than usual to increase notification frequency. In this case, an event to be detected is that a distance from a right or left line delimiting a traveling lane becomes equal to or less than a threshold value.

A driver having a "driving tendency: an inter-vehicular distance is close" and in a "state: irritated" is notified, at a timing when an inter-vehicular distance between a vehicle and another vehicle becomes equal to or less than a threshold value, that the inter-vehicular distance becomes equal to or less than the threshold value. In addition, the threshold value is increased than usual to increase notification frequency. In this case, an event to be detected is that an inter-vehicular distance between a vehicle and another vehicle becomes equal to or less than a threshold value.

A driver having a "driving tendency: an inter-vehicular distance is a safe distance" and in a "state: irritated" is notified, at a timing when an inter-vehicular distance between a vehicle and another vehicle becomes equal to or less than a threshold value, that the inter-vehicular distance becomes equal to or less than the threshold value. In addition, the threshold value is set to a same value as usual. In this case, an event to be detected is that an inter-vehicular distance between a vehicle and another vehicle becomes equal to or less than a threshold value.

A driver having a "driving tendency: weak point at lane change" and in a "state: anxious" is given a guidance of a timing for lane change when a blinker for lane change is put on. For example, the notification system 10 detects a situation of a vehicle traveling on a lane at a lane-change destination, computes a timing for lane change, based on a result of detection, and notifies a driver of the computed timing. In this case, an event to be detected is that a blinker for lane change is put on (example: a blinker is put on in a place other than right or left turning and on a two- or more-lane road).

A driver having a "driving tendency: strong point at lane change (smooth)" and in a "state: anxious" is notified, when a vehicle fast approaching from behind on a lane at a lane-change destination (example: a vehicle moving at predetermined velocity or more and a distance therefrom is less than a threshold value) is detected, that the fast approaching vehicle is detected. In this case, an event to be detected is presence of a vehicle fast approaching from behind on a lane at a lane-change destination.

A driver having a "driving tendency: brake after a red light is detected (just before a red light)" and in a "state: drowsy", and a driver having a "driving tendency: brake at a yellow light (stop with enough time)" and in a "state: drowsy" are notified, at a point in time when a yellow light is detected ahead of a traveling direction of a moving body, that the yellow light is detected. For example, the notification is performed by vibrating a steering wheel. In this case, an event to be detected is presence of a yellow light ahead of a traveling direction of a moving body.

A driver having a "driving tendency: a traveling position is unstable" and in a "state: drowsy", and a driver having a "driving tendency: a traveling position is stable" and in a "state: drowsy" are notified, at a timing when a distance from a right or left line delimiting a traveling lane becomes equal to or less than a threshold value, that the distance becomes equal to or less than the threshold value. For example, the notification is performed by vibrating a steering wheel. Note that, the threshold value may be increased than usual to increase notification frequency. In this case, an event to be detected is that a distance from a right or left line delimiting a traveling lane becomes equal to or less than a threshold value.

A driver having a "driving tendency: an inter-vehicular distance is close" and in a "state: drowsy" is notified, at a timing when drowsiness is detected, that the drowsiness is detected. For example, the notification is performed by vibrating a steering wheel.

A driver having a "driving tendency: an inter-vehicular distance is a safe distance" and in a "state: drowsy" is notified, at a timing when an inter-vehicular distance between a vehicle and another vehicle becomes equal to or less than a threshold value, that the inter-vehicular distance becomes equal to or less than the threshold value. For example, the notification is performed by vibrating a steering wheel. Note that, the threshold value may be increased than usual to increase notification frequency. In this case, an event to be detected is that an inter-vehicular distance between a vehicle and another vehicle becomes equal to or less than a threshold value.

A driver having a "driving tendency: tend to exceed legal velocity" and in a "state: distracted" is alerted at a timing when velocity of a moving body exceeds a threshold value. The threshold value is, for example, legal velocity. In this case, an event to be detected is that velocity of a moving body exceeds a threshold value.

A driver having a "driving tendency: not tend to exceed legal velocity (around legal velocity)" and in a "state: distracted" is alerted at a timing when a duration of a state of exceeding legal velocity exceeds a threshold value. In this case, an event to be detected is that a duration of a state in which velocity of a moving body exceeds legal velocity exceeds a threshold value.

A driver having a "driving tendency: brake after a red light is detected (just before a red light)" and in a "state: distracted" is notified, at a point in time when a yellow light is detected ahead of a traveling direction of a moving body, that the yellow light is detected. In this case, an event to be detected is presence of a yellow light ahead of a traveling direction of a moving body.

A driver having a "driving tendency: brake at a yellow light (stop with enough time)" and in a "state: distracted" is notified, when a yellow light is detected ahead of a traveling direction of a moving body and thereafter deceleration of the moving body cannot be detected within a predetermined period of time after the point in time, that a traffic signal ahead is a yellow light. In this case, an event to be detected is that a yellow light is detected ahead of a traveling direction of a moving body and thereafter deceleration of the moving body cannot be detected within a predetermined period of time after the point in time.

A driver having a "driving tendency: a traveling position is unstable" and in a "state: distracted" is notified, at a timing when a distance from a right or left line delimiting a traveling lane becomes equal to or less than a threshold value, that the distance becomes equal to or less than the threshold value. In this case, an event to be detected is that a distance from a right or left line delimiting a traveling lane becomes equal to or less than a threshold value.

A driver having a "driving tendency: a traveling position is stable" and in a "state: distracted" is notified, at a timing when a moving body crosses over a right or left line delimiting a traveling lane, that the moving body crosses over the right or left line. In this case, an event to be detected is that a moving body crosses over a right or left line delimiting a traveling lane.

Returning to FIG. 3, the detection unit 13 determines an "event to be detected" associated with driving feature information acquired by the driving feature information acquisition unit 11 and a state of a driver estimated by the state estimation unit 12, based on notification information (see FIG. 4 or 5) stored in the storage unit 15. Then, the detection unit 13 executes processing of detecting the determined event, based on data collected by a sensor mounted on a moving body.

The notification unit 14 executes notification to a driver upon detection of an event by the detection unit 13. The notification unit 14 determines a content to be notified to a driver at a time of detecting each event, based on notification information stored in the storage unit 15, and notifies the determined content. The notification by the notification unit 14 is achieved via a display, a speaker, a projection apparatus, a vibrator, a lamp, or the like.

Figure 6:
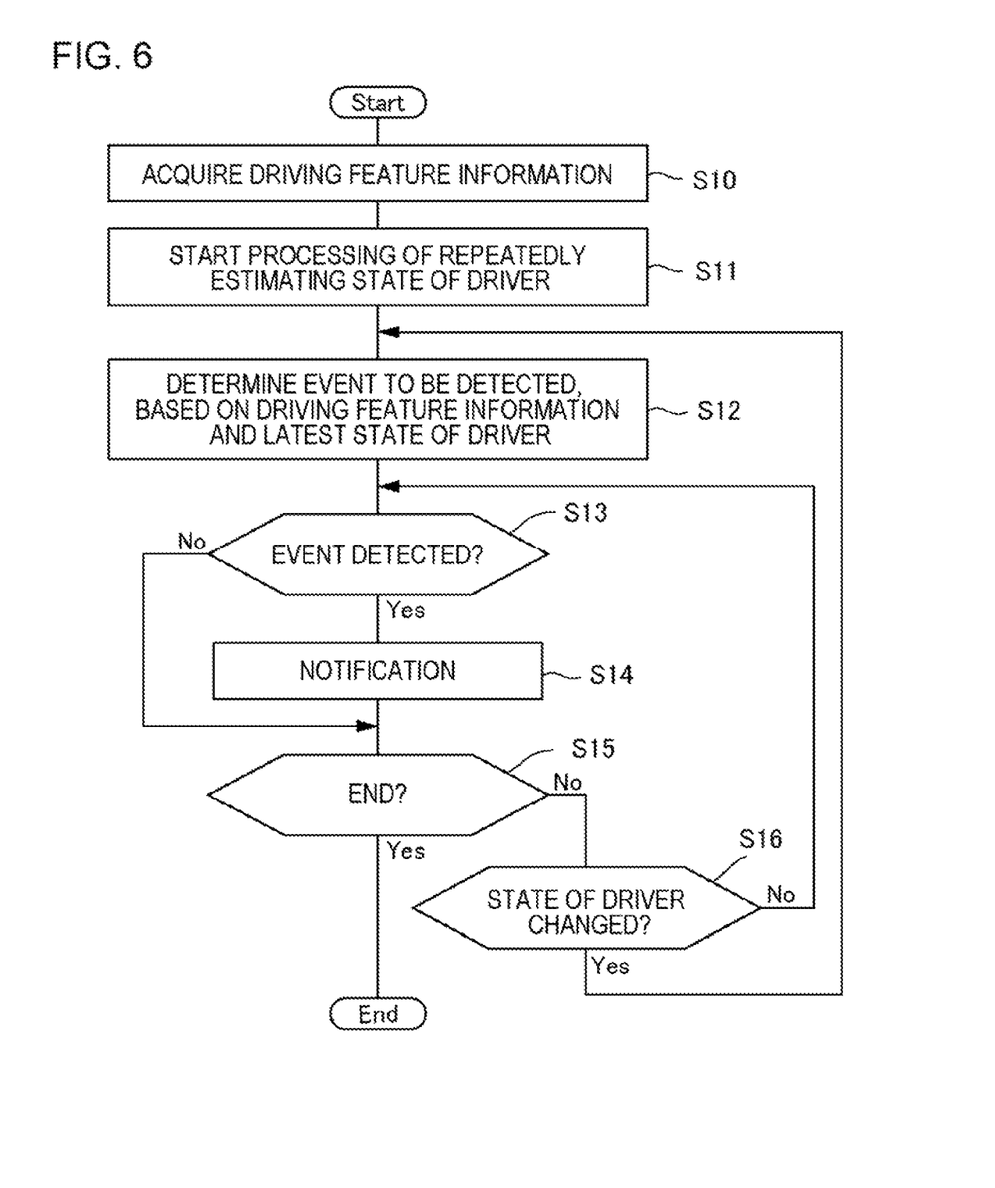
FIG. 6 is a flowchart illustrating one example of a flow of processing of the notification system according to the present example embodiment.

Next, one example of a flow of processing of the notification system 10 will be described by using a flowchart in FIG. 6.

First, the driving feature information acquisition unit 11 acquires driving feature information of a driver (S10).

For example, the driving feature information acquisition unit 11 acquires driver identification information at any timing after a moving body is powered on and before the moving body starts moving. The acquisition of driver identification information may be achieved by using a camera installed in a position and an orientation for photographing a driver sitting on a driver's seat, a fingerprint sensor installed on a power button, or the like, without any driver's operation for inputting driver identification information. Besides the above, the acquisition of driver identification information may be achieved by using an input apparatus such as a touch panel, an operation button, a microphone, or a fingerprint sensor, based on a driver's operation for inputting driver identification information.

The driving feature information acquisition unit 11 acquires driver identification information and thereafter reads out, for example, driving feature information associated with the driver identification information from the storage unit 15, and thereby achieves acquisition of driving feature information.

Further, the state estimation unit 12 starts processing of estimating a state of the driver, based on at least one of a piece of vital information, an appearance image, and a piece of speech data of the driver (S11). Then, the state estimation unit 12 continues the processing, and repeatedly estimates a state of the driver.

Next, the detection unit 13 determines an "event to be detected" associated with the driving feature information acquired in S10 and the latest state of the driver estimated in S11, based on notification information (see FIG. 4 or 5) stored in the storage unit 15 (S12). Then, the detection unit 13 executes processing of detecting the determined event, based on data collected by a sensor mounted on the moving body.

When the detection unit 13 detects the event (Yes in S13), the notification unit 14 executes notification to the driver upon the detection (S14). The notification unit 14 determines a content to be notified to the driver at a time of detecting the event, based on the notification information stored in the storage unit 15, and notifies the determined content.

Thereafter, when the state of the driver being repeatedly estimated after S12 has changed from the previous state (Yes in S16), the detection unit 13 determines an "event to be detected" associated with the driving feature information acquired in S10 and the latest state of the driver, based on notification information (see FIG. 4 or 5) stored in the storage unit 15 (S12). Then, the detection unit 13 executes processing of detecting the determined event, based on data collected by a sensor mounted on the moving body.

Modified Example

Next, a modified example of the notification system 10 will be described.

Modified Example 1

Figure 7:
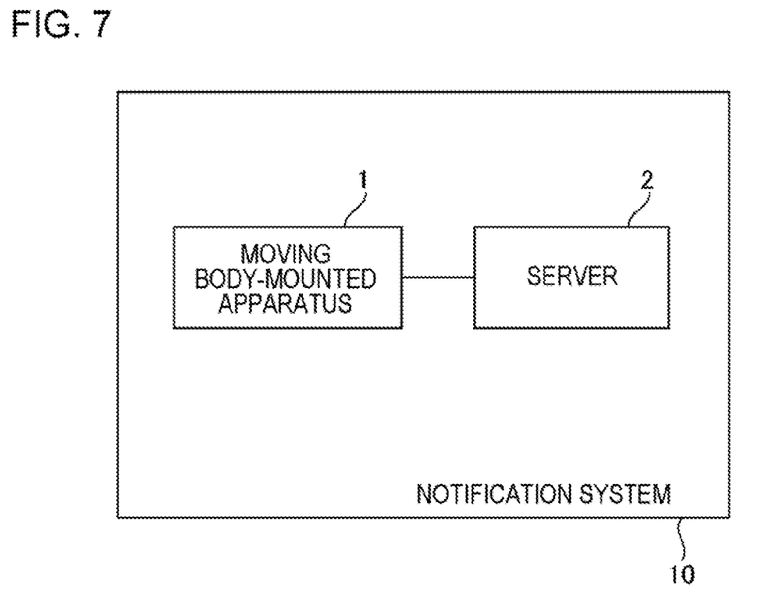
FIG. 7 is a function block diagram illustrating an implementation example of the notification system according to the present example embodiment.

In the modified example, the notification system 10 is configured by the moving body-mounted apparatus 1 and a server 2, as illustrated in FIG. 7. The moving body-mounted apparatus 1 and the server 2 are communicable by wire and/or wirelessly. Part of a plurality of function units illustrated in FIG. 3 is achieved by the moving body-mounted apparatus 1, and rest is achieved by the server 2.

Modified Example 2

The detection unit 13 detects, as a first event, when a driving level indicated by driving feature information is equal to or less than a reference value, that a predetermined driving operation can be performed with no predetermined trouble. For example, the detection unit 13 may detect, as a first event, that lane change can be performed with no trouble interfering with driving of another vehicle (deceleration, lane change, or the like of another vehicle).

Then, the notification unit 14 notifies, upon detection of the first event, a driver that the predetermined driving operation is successfully performed.

Modified Example 3

The notification unit 14 notifies, when a driving level indicated by driving feature information has improved from a driving level indicated by driving feature information acquired in past, a driver that the driving level has improved.

As described above, in one example, driving feature information is generated based on data being collected by a sensor mounted on a moving body during past driving of a driver. In this case, when the data are newly collected, the driving feature information is updated accordingly. For example, when the driving feature information is updated and a driving level has improved from a past driving level, information indicating that the driving level has improved may be registered in the driving feature information. Then, when the information indicating that the driving level has improved from the past driving level is registered in the driving feature information newly acquired by the driving feature information acquisition unit 11, the notification unit 14 may notify a driver that the driving level has improved.

Note that, the notification may be performed only for a driver whose driving level indicated by driving feature information is equal to or less than a reference value, or may be performed for all drivers.

Modified Example 4

The detection unit 13 detects a risk (event) involving an obstacle around a moving body. For example, the detection unit 13 detects approaching (a distance being equal to or less than a threshold value) to a peripheral obstacle.

When the event is detected, the notification unit 14 determines a fault of a driver in the event, based on data being collected by a sensor mounted on the moving body. For example, the notification unit 14 determines, based on a traveling position in a traveling lane or a status of a traffic signal, whether the driver has performed driving not following a rule (example: rushing through a red light, traveling out of a traveling lane, or the like), or the like. Then, when determining that the driver has no fault, the notification unit 14 notifies the driver that the driver has no fault. The notification enables the driver to feel relieved and keep calm.

Note that, the notification may be performed only for a driver whose driving level indicated by driving feature information is equal to or less than a reference value, or may be performed for all drivers. Further, a driving level of a driver to be notified may be determined according to a type of a detected risk. Naturally, notification frequency is set higher as lower a driving level is.

Advantageous Effect

The notification system 10 according to the present example embodiment can adjust a way of notification to a driver, based on an essential feature (a driving level, a driving tendency, or the like) of the driver and a state (an emotion, drowsiness, distraction, or the like) of the driver at that time. Thus, appropriate notification with appropriate frequency that matches a state of each driver at that time can be performed for each driver.

Further, the notification system 10 according to the present example embodiment can notify, when a driver whose driving level is low can perform a predetermined driving operation with no predetermined trouble, the driver that the driving operation is successfully performed. The notification enables the driver to be confident about his/her driving. Note that, a driver whose driving level is high is very likely to feel the notification annoying. Thus, the notification is not performed for a driver whose driving level is high. In this way, the notification system 10 can perform appropriate notification for each driver that matches each driver.

Further, the notification system 10 according to the present example embodiment can notify a driver that a driving level has improved. The notification enables the driver to be confident about his/her driving.

Note that, "acquisition" in the present description includes at least one of "fetching (active acquisition), by an own apparatus, data stored in another apparatus or storage medium", based on a user input or based on an instruction of a program, for example, requesting or inquiring another apparatus to receive data, accessing another apparatus or storage medium to read out data therefrom, or the like, "inputting (passive acquisition), to an own apparatus, data output from another apparatus", based on a user input or based on an instruction of a program, for example, receiving delivered (transmitted, push-notified, or the like) data, selectively acquiring received data or information, and "generating new data by editing data (such as conversion to a text, sorting of data, extraction of some data, or change of a file format) or the like, and acquiring the generated new data".

The whole or part of the above-described example embodiments can be described as, but not limited to, the following supplementary notes.

1. A notification system including:
    a driving feature information acquisition unit that acquires driving feature information that indicates a driving feature including at least one of a driving level and a driving tendency of a driver;
    a state estimation unit that estimates a state of the driver, based on at least one of a piece of vital information, an appearance image, and a piece of speech data of the driver;
    a detection unit that determines an event to be detected associated with the acquired driving feature information and the estimated state, based on notification information in which the event and a content to be notified to the driver at a time of detecting the event are determined for each the driving feature and for each the state of the driver, and executing processing of detecting the determined event; and
    a notification unit that determines a content to be notified to the driver at a time of detecting the event, based on the notification information, and notifying the determined content.

2. The notification system according to supplementary note 1, wherein,
    as the event to be detected, an event for which a predetermined measured value collected by a sensor mounted on a moving body deviates from a reference range is defined in the notification information, and an upper limit value or a lower limit value of the reference range is different for each the driving feature.

3. The notification system according to supplementary note 1 or 2, wherein,
    as the event to be detected, an event for which a predetermined measured value collected by a sensor mounted on a moving body deviates from a reference range is defined in the notification information, and an upper limit value or a lower limit value of the reference range is different for each the state of the driver.

4. The notification system according to any one of supplementary notes 1 to 3, wherein
    a number of the events to be detected defined in the notification information is larger as lower the driving level is.

5. The notification system according to any one of supplementary notes 1 to 4, wherein
    the detection unit detects, as a first event, when a driving level indicated by the driving feature information is equal to or less than a reference value, that a predetermined driving operation can be performed with no predetermined trouble, and
    the notification unit notifies, upon detection of the first event, the driver that the driving operation is successfully performed.

6. The notification system according to any one of supplementary notes 1 to 5, wherein
    the notification unit notifies, when a driving level indicated by the driving feature information has improved from a driving level indicated by the driving feature information acquired in past, the driver that the driving level has improved.

7. The notification system according to any one of supplementary notes 1 to 6, wherein
    the driving feature information is generated based on data being collected by a sensor mounted on a moving body during past driving of the driver.

8. The notification system according to any one of supplementary notes 1 to 7, wherein
    the state of the driver includes an emotion of the driver.

9. A notification method including,
    by a computer:
    acquiring driving feature information that indicates a driving feature including at least one of a driving level and a driving tendency of a driver;
    estimating a state of the driver, based on at least one of a piece of vital information, an appearance image, and a piece of speech data of the driver;
    determining an event to be detected associated with the acquired driving feature information and the estimated state, based on notification information in which the event and a content to be notified to the driver at a time of detecting the event are determined for each the driving feature and for each the state of the driver, and executing processing of detecting the determined event; and
    determining a content to be notified to the driver at a time of detecting the event, based on the notification information, and notifying the determined content.

10. A program causing a computer to function as:
- a driving feature information acquisition unit that acquires driving feature information that indicates a driving feature including at least one of a driving level and a driving tendency of a driver;
- a state estimation unit that estimates a state of the driver, based on at least one of a piece of vital information, an appearance image, and a piece of speech data of the driver;
- a detection unit that determines an event to be detected associated with the acquired driving feature information and the estimated state, based on notification information in which the event and a content to be notified to the driver at a time of detecting the event are determined for each the driving feature and for each the state of the driver, and executing processing of detecting the determined event; and
- a notification unit that determines a content to be notified to the driver at a time of detecting the event, based on the notification information, and notifying the determined content.

REFERENCE SIGNS LIST

10 Notification system
11 Driving feature information acquisition unit
12 State estimation unit
13 Detection unit
14 Notification unit
15 Storage unit
1A Processor
2A Memory
3A Input/output I/F
4A Peripheral circuit
5A Bus

What is claimed is:

1. A notification system comprising:
at least one memory storing one or more instructions; and
at least one processor configured to execute the one or more instructions to, for each of a plurality of drivers:
acquire driving feature information that indicates a driving feature including at least one of a driving level and a driving tendency of a driver;
estimate a state of the driver, based on at least one of a piece of vital information, an appearance image, and a piece of speech data of the driver;
determine an event to be detected associated with the acquired driving feature information and the estimated state, based on notification information in which the event and content to be notified to the driver at a time of detecting the event are determined for the driving feature and for the state of the driver, and executing processing of detecting the determined event;
determine the content to be notified to the driver at a time of detecting the event, based on the notification information; and
notify the driver of the determined content, wherein
the event to be detected while each driver is driving is different from each other depending on both the driving feature of each driver and the state of each driver, and
the content to be notified to each driver when detecting a same event is different from each other depending on both the driving feature of each driver and the state of each driver.

2. The notification system according to claim 1, wherein, as the event to be detected, an event for which a predetermined measured value collected by a sensor mounted on a moving body deviates from a reference range is defined in the notification information, and an upper limit value or a lower limit value of the reference range is different for the driving feature.

3. The notification system according to claim 1, wherein, as the event to be detected, an event for which a predetermined measured value collected by a sensor mounted on a moving body deviates from a reference range is defined in the notification information, and an upper limit value or a lower limit value of the reference range is different for the state of the driver.

4. The notification system according to claim 1, wherein a number of events to be detected defined in the notification information is larger as lower the driving level is.

5. The notification system according to claim 1, wherein the at least one processor is further configured to execute the one or more instructions to detect, as a first event, when the driving level indicated by the driving feature information is equal to or less than a reference value, that a predetermined driving operation can be performed with no predetermined trouble, and
notify, upon detection of the first event, the driver that the driving operation is successfully performed.

6. The notification system according to claim 1, wherein the at least one processor is further configured to execute the one or more instructions to notify, when the driving level indicated by the driving feature information has improved from the driving level indicated by the driving feature information acquired in past, the driver that the driving level has improved.

7. The notification system according to claim 1, wherein the driving feature information is generated based on data collected by a sensor mounted on a moving body during past driving of the driver.

8. The notification system according to claim 1, wherein the state of the driver includes an emotion of the driver.

9. A notification method performed by a computer and comprising:
for each of a plurality of drivers:
acquiring driving feature information that indicates a driving feature including at least one of a driving level and a driving tendency of a driver;
estimating a state of the driver, based on at least one of a piece of vital information, an appearance image, and a piece of speech data of the driver;
determining an event to be detected associated with the acquired driving feature information and the estimated state, based on notification information in which the event and content to be notified to the driver at a time of detecting the event are determined for the driving feature and for the state of the driver;
executing processing of detecting the determined event;
determining the content to be notified to the driver at a time of detecting the event, based on the notification information; and
notifying the driver of the determined content, wherein
the event to be detected while each driver is driving is different from each other depending on both the driving feature of each driver and the state of each driver, and
the content to be notified to each driver when detecting a same event is different from each other depending on both the driving feature of each driver and the state of each driver.

10. A non-transitory storage medium storing a program executable by a computer to perform processing comprising:
for each of a plurality of drivers:
acquiring driving feature information that indicates a driving feature including at least one of a driving level and a driving tendency of a driver;
estimating a state of the driver, based on at least one of a piece of vital information, an appearance image, and a piece of speech data of the driver;
determining an event to be detected associated with the acquired driving feature information and the estimated state, based on notification information in which the event and content to be notified to the driver at a time of detecting the event are determined for each the driving feature and for each the state of the driver;
executing processing of detecting the determined event;
determining the content to be notified to the driver at a time of detecting the event, based on the notification information; and
notifying the driver of the determined content, wherein
the event to be detected while each driver is driving is different from each other depending on both the driving feature of each driver and the state of each driver, and
the content to be notified to each driver when detecting a same event is different from each other depending on both the driving feature of each driver and the state of each driver.

* * * * *